(12) United States Patent  
Curcio et al.

(10) Patent No.: US 8,997,206 B2  
(45) Date of Patent: Mar. 31, 2015

(54) PEER-TO-PEER NETWORK OVER A VIRTUAL PRIVATE NETWORK

(75) Inventors: Joseph Curcio, Toms River, NJ (US); Mahalingam Mani, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 2371 days.

(21) Appl. No.: 11/759,061

(22) Filed: Jun. 6, 2007

(65) Prior Publication Data

US 2008/0307519 A1    Dec. 11, 2008

(51) Int. Cl.
*H04L 9/00* (2006.01)
*H04L 29/08* (2006.01)
*H04L 29/06* (2006.01)

(52) U.S. Cl.
CPC .......... *H04L 67/104* (2013.01); *H04L 63/0227* (2013.01); *H04L 63/0272* (2013.01); *H04L 67/1057* (2013.01); *H04L 69/161* (2013.01); *H04L 69/16* (2013.01)
USPC .......................................................... 726/15

(58) Field of Classification Search
CPC .................................................. H04L 63/0272
USPC .......................................................... 726/15
See application file for complete search history.

(56) References Cited

U.S. PATENT DOCUMENTS

| | | | |
|---|---|---|---|
| 7,165,107 B2 * | 1/2007 | Pouyoul et al. | 709/225 |
| 7,167,920 B2 * | 1/2007 | Traversat et al. | 709/230 |
| 7,197,565 B2 * | 3/2007 | Abdelaziz et al. | 709/226 |
| 7,200,674 B2 * | 4/2007 | Sapuram et al. | 709/238 |
| 7,421,736 B2 * | 9/2008 | Mukherjee et al. | 726/15 |
| 2004/0006708 A1 * | 1/2004 | Mukherjee et al. | 713/201 |
| 2004/0148439 A1 | 7/2004 | Harvey et al. | |
| 2005/0060406 A1 | 3/2005 | Zhang | |
| 2007/0004436 A1 | 1/2007 | Stirbu | |
| 2007/0039053 A1 * | 2/2007 | Dvir | 726/24 |
| 2007/0209071 A1 * | 9/2007 | Weis et al. | 726/15 |
| 2008/0183853 A1 * | 7/2008 | Manion et al. | 709/223 |

FOREIGN PATENT DOCUMENTS

| | | |
|---|---|---|
| EP | 1385311 | 1/2004 |
| EP | 1515520 | 3/2005 |

OTHER PUBLICATIONS

Aoyagi et al., ELA: A Fully Distributed VPN System over Peer-to-Peer Network, IEEE Computer Society, Proceedings of the 2005 Symposium on Applications and the Internet, 2005, 4 pages, 0-7695-2262-9/05.

Kolageraki, et al., "On Constructing Overlay Network to Support Distributed Real-Time Virtual Environment Applications", Object-Oriented Real-Time Dependable Systems, 10th IEEE International Workshop, Feb. 2, 2005, pp. 355-362, Piscataway, NJ.

(Continued)

*Primary Examiner* — Farid Homayounmehr
(74) *Attorney, Agent, or Firm* — Sheridan Ross P.C.

(57) ABSTRACT

The present invention provides a new network topology. More specifically, a peer-to-peer network is defined on a virtual private network. The peer-to-peer network comprises a set of specified users within a virtual private network that are allowed to communicate according to predetermined rules enforced by the peer-to-peer network itself. This affords secure communication between the specified users of the peer-to-peer network independent of the virtual private network.

25 Claims, 9 Drawing Sheets

(56) References Cited

OTHER PUBLICATIONS

Nakajima, et al., "A virtual overlay network for integrating home appliances", IEEE Computer Society, Proceedings of the 2002 Symposium on Applications and the Internet, 2002, pp. 246-253.
Extended European Search Report for European Application No. 08007514, dated Apr. 15, 2009.
Background for the above captioned application (previously provided).
Official Action for European Patent Application No. 08007514.6, dated Oct. 30, 2014 8 pages.
Official Action for Canada Patent Application No. 2,628,560, dated Dec. 15, 2010, 2 pages.
Official Action with English translation for China Patent Application No. 200810107958.5, dated Nov. 14, 2011 8 pages.
Official Action with English Translation for China Patent Application No. 200810107985.5, dated Aug. 29, 2012 7 pages.
Official Action for European Patent Application No. 08007514.6, dated Nov. 6, 2012 11 pages.
English Translation of Official Action for Japan Patent Application No. 2008-148684, mailed Feb. 23, 2011 2 pages.
Notice of Allowance with English Translation for Korea Patent Application No. 10-2008-0051076, mailed Nov. 19, 2013 3 pages.

\* cited by examiner

Fig. 4A — 404

| User | Communication Device | ID | Key | P2P Network | Policies |
|---|---|---|---|---|---|
| User 1 | Computer xxxxx01, Phone ext. 2709 | 014635 | Ka1 Ke1 | Finance | Encryption Policy, Security Policy, External Comm's, Applications |
| User 2 | Computer xxxxx02, Phone ext. 4323 | 456852 89723 | Ka2 | Engineering | Security, Applications |
| User 3 | Computer xxxxx03 | 871183 | Ka3 Ke3 | Legal | Encryption Policy, Security Policy, External Comm's, Applications |
| ... | ... | ... | ... | ... | ... |
| User N | Phone ext. 7384 | 548997 | Ka4 | Engineering | Security, Applications |

| P2P Network | Users | ID | Key | Policies |
|---|---|---|---|---|
| Finance | User 1, 5, 7 and 9 | 11211 | Key 1 | Encryption Policy, Security Policy, External Comm's, Applications |
| Engineering | User 2, 4, 6, 8, and 9 | 11311 | Key 2 | Security, Applications |
| ... | ... | ... | ... | ... |
| Legal | User 3, 4, and 11 | 22822 | Key 3 | Encryption Policy, Security Policy, External Comm's, Applications |

436 / 440 / 444 / 448 / 452

PEER-TO-PEER NETWORK OVER A VIRTUAL PRIVATE NETWORK

FIELD OF THE INVENTION

The invention relates generally to communication systems and networks. More particularly, the invention relates to peer-to-peer networks and virtual private networks.

BACKGROUND

In the global economy of today, multi-state and multinational companies are commonplace. For such businesses to work effectively, secured intracompany communication channels are of significant importance. Until recently, leased lines ranging from Integrated Services Digital Network (ISDN) to OC3 (Optical Carrier-3) fiber have been employed. The Internet has provided the framework for a new, less expensive intracompany communication modality known as the Virtual Private Network (VPN).

A VPN is essentially a private network that uses a public network (e.g., the Internet) to connect remote sites or users together. Unlike leased lines that use a dedicated connection, the VPN uses "virtual" connections routed or tunneled through the Internet from a company's private network or central site to the remote site of the employee. A "tunnel" is an intermediary program, which is acting as a blind relay between two connections. The tunnel can be formed as defined by any number of protocols, including the Internet Security Protocol (IPsec), the Point-to-Point Tunneling Protocol or PPTP, and the Layer 2 Tunneling Protocol (L2TP).

There are two primary types of encrypted VPNs extended to teleworkers, namely IPsec VPNs and Secure Sockets Layer/Transport Layer Security (SSL/TLS) VPNs. IPsec VPNs connect between a corporate server and a dedicated hardware or software client. Such VPNs support TCP or UDP traffic and can be extended to support other traffic types through the use of GRE (Generic Routing Encapsulation). SSL VPNs allow clients to use general purpose web browsers to connect to an enterprise's VPN server. They are more limited in functionality than IPsec VPNs, because they support only TCP traffic.

The process to effect a typical VPN session will be discussed with reference to FIG. 1. The central site 100 includes a firewall 104, main office LAN 108, and VPN server 112 (such as IPsec or SSL VPN server). The remote site 116 includes a firewall 120, VPN client 124, and remote office LAN 128. The two LANs 108 and 128 are interconnected by an untrusted network 132 (such as the Internet).

Although the VPN server 112 is depicted as being separately connected to the main office LAN 108, the VPN server 112 may also reside between the main office LAN 108 and the firewall 104. Alternatively, the VPN server 112 may be integrated to the firewall 104.

Tunneling is used by the VPN client 124 and server 112 to effect secured communications between a remote communication device and the central site. Tunneling places the entire packet within another packet and sends the encapsulated packets over the untrusted network 132. Tunneling requires three different protocols, namely a carrier protocol dictated by the untrusted network (e.g., IP), an encapsulating protocol (such as Generic Routing Encapsulation or GRE, IP Security Protocol or IPsec, Layer 2 Forwarding or L2F protocol, Point-to-Point Tunneling Protocol or PPTP, Layer 2 Tunneling Protocol or L2TP, Secure Socket Layer (SSL), Transport Layer Security TLS, Layer 3, and the like), and a passenger protocol dictated by the original data (IPX, NetBeui, IP, and Voice over IP or VoIP protocol(s)) being carried. For example, in IPsec an IP packet is encrypted and encapsulated inside another IP header.

Creation of a VPN helps to establish a secured communication channel between the secure main office LAN 108 and a remote office LAN 116. One downside to current VPNs is that they rely upon a VPN server 112 to facilitate secured communications. Accordingly, communications processing capabilities such as bandwidth are determined and limited by the capabilities of the VPN server 112. Peer-to-peer (P2P) networks on the other hand rely primarily on the computer power and bandwidth of participants in the network rather than concentrating it in a relatively low number of servers. P2P networks are useful in instances where users wish to share files and other real-time and non-real-time data or communications.

Examples of current Internet based P2P networks include Skype, Nimeat, Yahoo Instant Messenger and the like. Such P2P networks are relatively straightforward direct-connected networks, discounting that some need an arbitrating server like STUN, ICE, TURN and so on for resolving connectivity when a caller and/or callee operates behind Network Address Translation (NAT) devices or rely on Internet-based non-NATed intermediaries. Such P2P networks do not rely on an overlay topology to operate. Rather, most P2P networks are like any two entities communicating with one another in a communication network. Moreover, any grouping of P2P participants is not currently driven by client rules. Rather, groupings of P2P participants are traditionally based on a rules-based grouping or community as facilitated by central servers for presence and other policies. This takes control of the P2P network away from the client. In other words, current P2P networks are not currently completely autonomous from the rest of the network, although such, networks can distribute processing tasks.

There have been suggestions to combine VPNs with P2P networks. For example, in an IEEE paper by Aoyagi et al, entitled "ELA: A Fully Distributed VPN System over Peer-to-Peer Network", the entire contents of which are hereby incorporated, herein by this reference, a fully distributed VPN system over a P2P network is proposed. The fully distributed VPN system over the P2P network is referred to therein as an Everywhere Local Area (ELA) network. The ELA network allows the establishment of a private overlay network for a VPN among nodes of a group without any servers. This allows the VPN system to build up without tire user of a VPN server, thereby alleviating the processing bottleneck and single point of failure inherent to the VPN server. Although this particular paper helps distribute the processing problems inherent with conventional VPNs, the paper does not address the problems associated with P2P networks, which are traditionally not standalone or autonomous.

SUMMARY

These and other needs are addressed by various embodiments and configurations of the present invention. The present invention is directed generally to a system, device, and method that facilitates the overlay of a P2P network on a VPN.

In accordance with one embodiment of the present invention, a method is provided, the method generally comprising:

providing a an overlay network for a first set of communication devices; and defining a peer-to-peer network for a second set of communication devices over the overlay network.

The overlay network may be established over an existing public or private communications network. In one embodiment, the overlay network comprises a VPN overlay network established over a public communications network such as the Internet.

The establishment of a P2P network over an overlay network allows members of the P2P network to enjoy completely autonomous P2P communications with one another under a client rule driven configuration. In accordance with one embodiment of the present invention, communication policies may be defined for the P2P network that control and coordinate communications at the application, transport, and network layers of the Open Systems Interconnect (OSI) model or the Transportation Control Protocol/Internet Protocol (TCP/IP) model, whereas traditional P2P networks only coordinated communications policies at the application layer. The autonomy of the P2P network is useful in creating customized P2P networks that can establish secure communications within the P2P network. Furthermore, since the P2P network is established over the overlay network, the P2P network necessarily inherits the boundaries and some security policies associated with the overlay network. In one embodiment, there is a good degree of infrastructure dependency (e.g., a dependency upon DNS and DHCP of the overlay network at a minimum), but pare autonomy of P2P communications is available at the application layer.

It is another aspect of the present invention to provide a device that facilitates the creation of a P2P network over an overlay network. In accordance with one embodiment of the present invention, the device comprises a management console adapted to define a P2P network over an overlay networks where the P2P network includes a second set of users within the first set of users belonging to the overlay network.

By creating a P2P network over an overlay network the autonomy of the P2P network is achievable that has not heretofore been realized. Therefore, the use of security, selective control, and authorizations (e.g., variable-length and variable-control leash to the overlay network) is possible for the P2P network, meaning that the P2P is autonomous to the extent that its policies can be defined away from the infrastructure upon which it relies.

As used herein "user" is used to refer to any person or thing that is capable of making use of and/or interacting with a communication device.

These and other advantages will be apparent from the disclosure of the invention's) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B said C together.

BRIEF DESCRIPTION OF THE DRAWINGS

FIG. 3 is a block diagram depicting possible configurations of a P2P network in accordance with embodiments of the present invention;

FIG. 4A is a diagram depicting a first possible data structure employed in Accordance with embodiments of the present invention;

FIG. 4B is a diagram depicting a second possible data structure employed in accordance with embodiments of the present invention;

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to create a P2P network.

The exemplary systems and methods of this invention will also be described in relation to IP communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond, the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a broadcast head end server, at one or more users' premises, or some combination thereof. Similarly, one or more functional portions of the system could be distributed between a server, gateway, PBX, and/or associated communication device.

Figure 1:
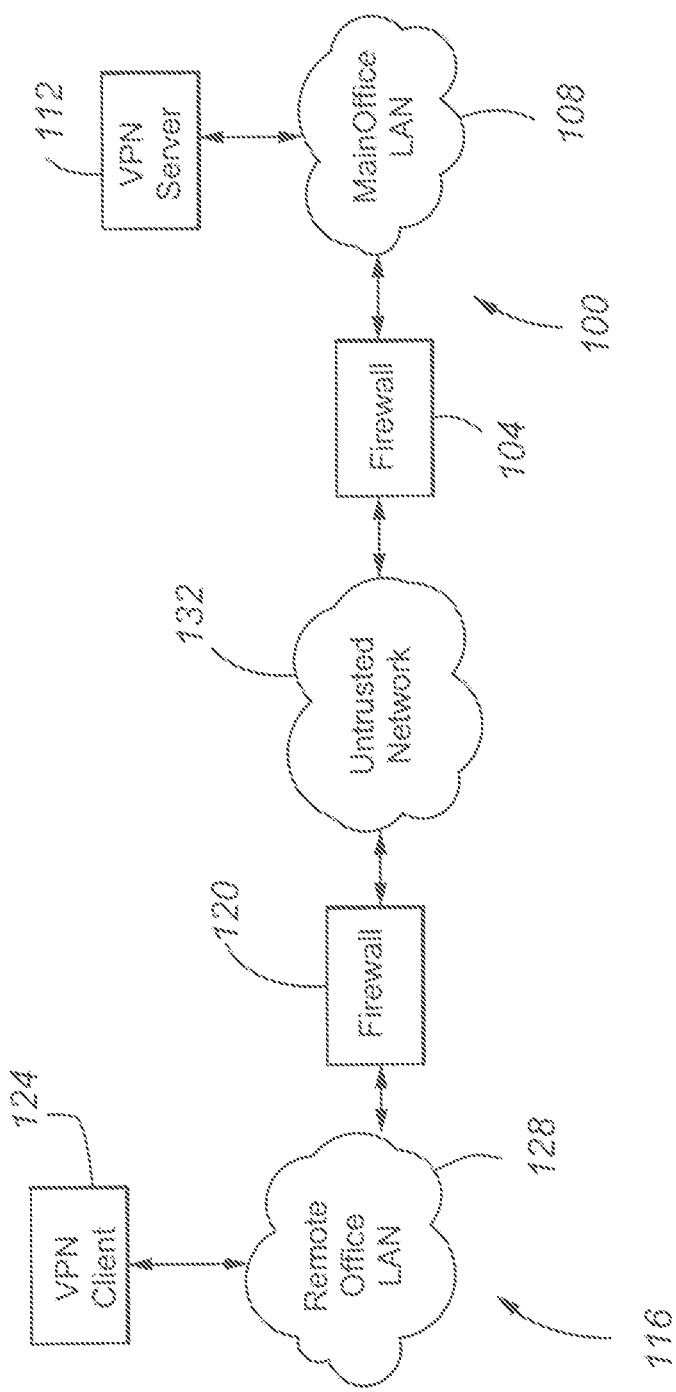
FIG. 1 is a block diagram depleting a VPN system in accordance with embodiments of the prior art.
Figure 2:
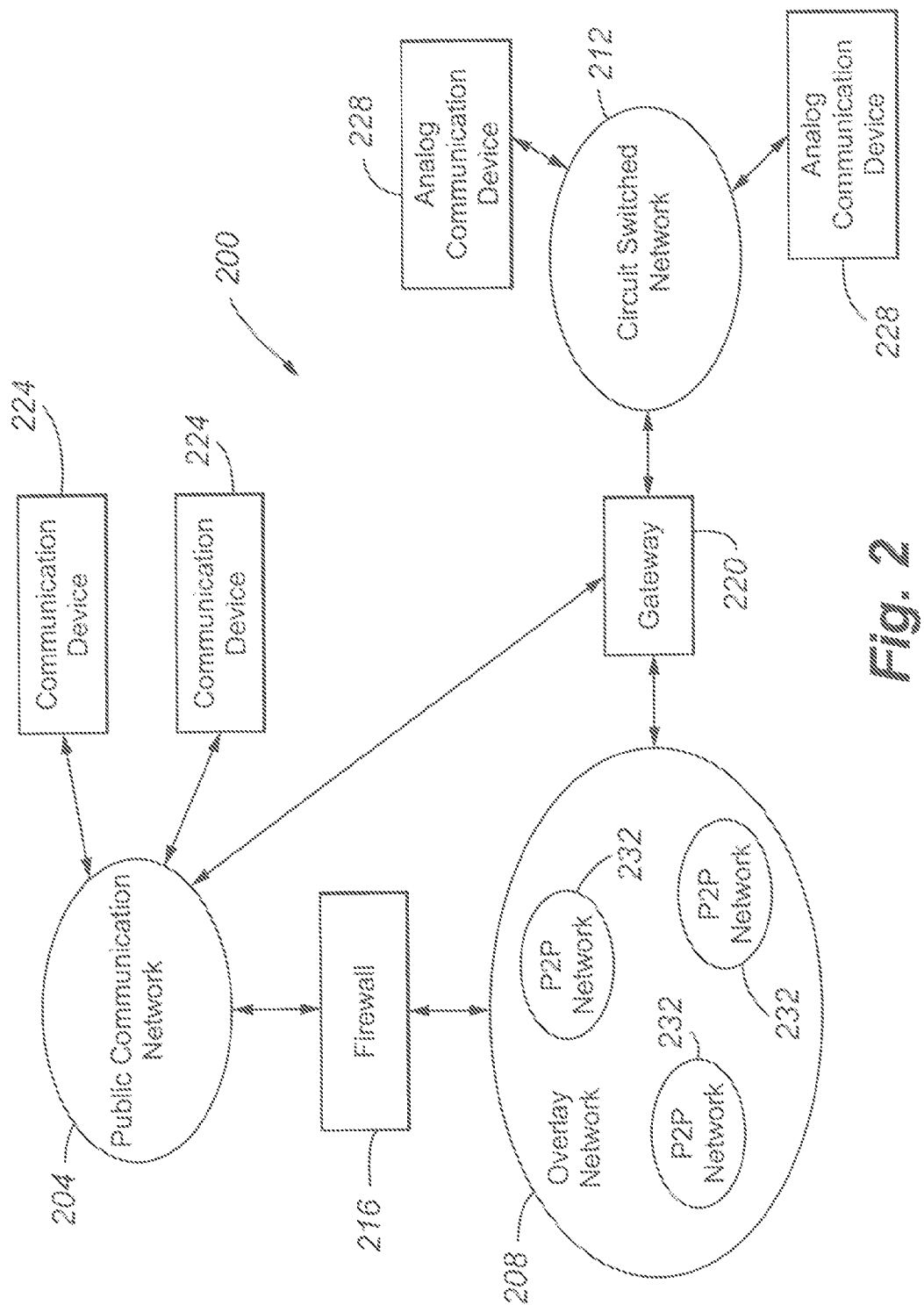
FIG. 2 is a block diagram depicting a communication system with a P2P network on an overlay network in accordance with embodiments of the present invention.

Referring initially to FIG. 2, a communication system 200 will be described in accordance with at least some embodiments of the present invention. The communication system 200 generally comprises a public or untrusted communication network 204 such as the Internet, an overlay network 208, and a circuit switched network 212. The overlay network 208 may comprise a private network operating over the public communication network 204. In accordance with one embodiment of the present invention, the overlay network 208 comprises a VPN network. Of course, the overlay network 208 may comprise other types of communication networks operating over the public communication network 204 such as the Mbone, Abone, or 6bone overlay networks. The overlay network 208 may also comprise any other type of enterprise network known in the art.

The overlay network 208 uses tunnels to form a virtual network on top of the public communication network 204. The user of a VPN overlay network 208 is provided with the benefits of a private network, such as access to enterprise servers, access to a company Intranet, and so on, while the enterprise maintaining the VPN overlay network 208 benefits from the low operational costs offered by administering an overlay network on top of the public communication network 204. Different nodes of a VPN overlay network 208 may be connected to a common server (i.e., in a hub-and-spoke configuration) or connected in a decentralized fashion to a number of different servers (i.e., in a mesh configuration). Examples of suitable VPN overlay networks 208 include, but are not limited to, an IPsec VPN, an SSL/TLS VPN, an open VPN, a Point-to-Point Tunneling Protocol (PPTP) VPN, a Layer 2 Tunneling Protocol (L2TP) VPN, P2TP version 3 VPN, a Multi-Protocol Label Switching (MPLS) VPN, a Layer 2 Forwarding (L2F) VPN, a Layer 3 VPN, or any other type of known IP-based VPN.

In accordance with at least one embodiment of the present invention, the overlay network 208 comprises at least one P2P network 232 defined therein. More specifically, the P2P network 232 is established on top of the overlay network 208. This allows the realization of a P2P network 232 that is completely autonomous, not only at its application layer, but also at the transport and network layer. This allows the P2P network 232 to have user-defined parameters for each layer (i.e., network, transport, and application level user-access control or enterprise leash) while allowing for islands of IP communication devices to communicate P2P. The P2P network 232 also inherits the security features of the overlay network 208. The creation of the P2P network 232 within the overlay network 208 affords the creation of autonomous communities of users and/or communication devices (i.e., entities) that wish to have either different security policies or wish to assure quality communications between members of the P2P network 232.

As an example, the P2P network 232 may be defined on top of an IPsec VPN overlay network 208 by applying an application-specific transport-selector in the VPN. The application-specific transport-selector may establish communication policies for the P2P network 232 that are applied to all members of the P2P network 232. In accordance with one embodiment, the policies for the P2P network 232 differ from communication policies of other communication devices belonging to the VPN overlay network 208 but not the P2P network 232.

The overlay network 208 may be connected to the public communication network 204 via a firewall 216 or similar type of security device. The firewall 216 helps establish the overlay network 208 on top of the public communication network 204 while maintaining security within the overlay network 208. The firewall 216 may be adapted to support a number of different NAT types for connecting a number of different communication devices, detect intrusion of the overlay network 208 from communication devices outside the network, check for virus threats, and perform other functions associated with facilitating an overlay network 208.

The public communication network 204 and the overlay network 208 are characterized by the ability to support packet-based communications and communication protocols, such as Internet Protocol (IP) communications, which operates at the network layer of the OSI model or TCP/IP model. The public communication network 204 and the overlay network 208 may be adapted to communicate with a non-packet-based network such as the circuit-switched network 212 via a gateway 220. The circuit-switched network 212 may support the transmission of analog and/or digital communication signals from one endpoint to another. The conversion of messages from analog and/or digital signals to packet-based signals is accomplished by the gateway 220. The gateway 220 may also support the conversion of packet-based signals to analog and/or digital signals. Accordingly, packet-based communication devices 224 may be able to communicate with analog communication devices 228 through their respective communication network via the gateway 220. Furthermore, packet-based communication devices belonging to the overlay network 208 and/or the P2P network within the overlay network 208 may also be enabled to communicate with the analog communication devices 228.

Figure 3A:
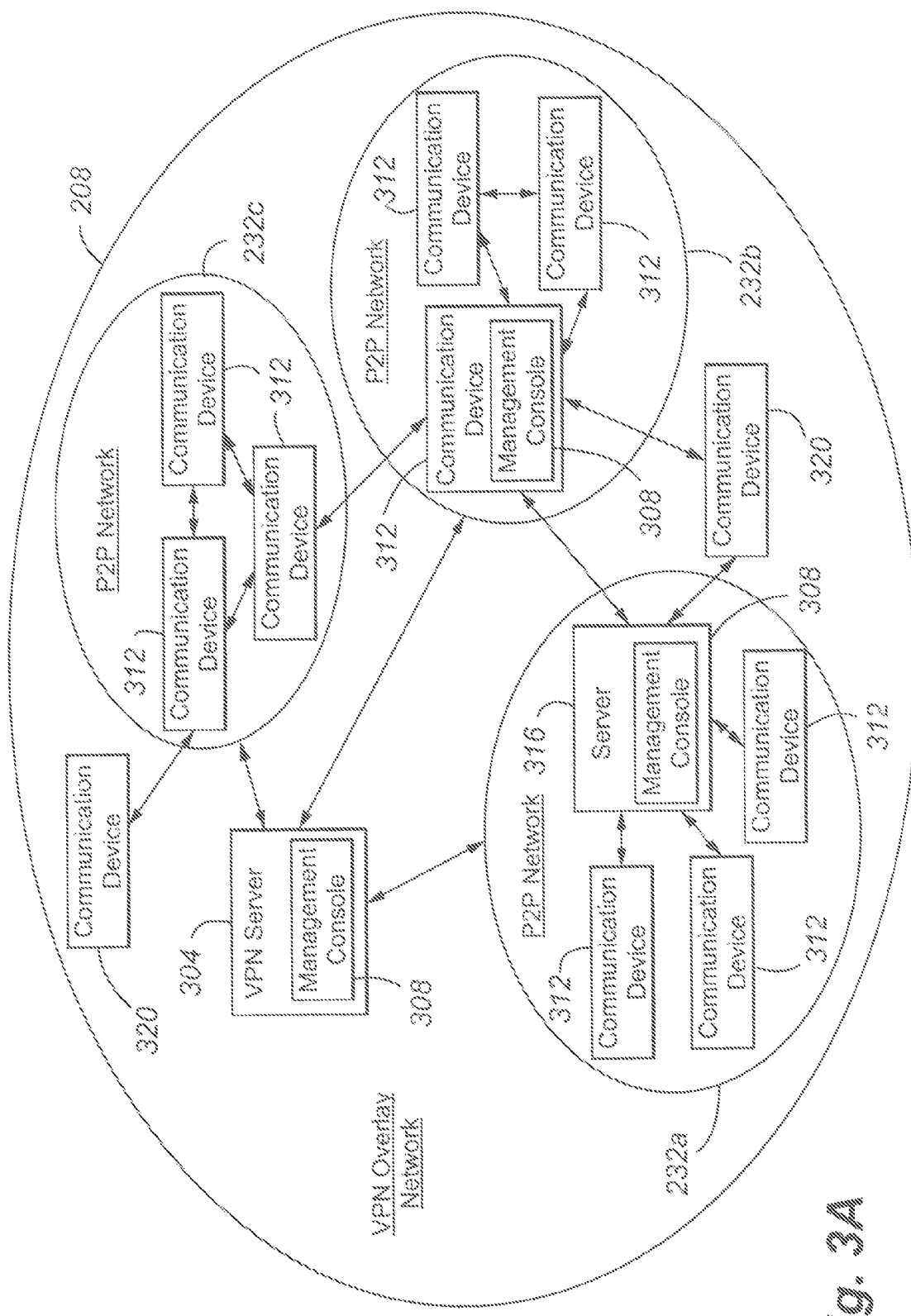
FIG. 3A is a block diagram depicting possible configurations of a P2P network in accordance with embodiments of the present invention.

FIG. 3A depicts an exemplary VPN overlay network 208 in accordance with at least some embodiments of the present invention. The VPN overlay network 208 is depicted to comprise three different P2P networks 232a-c. Although three P2P networks 232 are depicted on the VPN overlay network 208, one skilled in the art will appreciate that a greater or lesser number of P2P networks 232 may be established over a VPN overlay network 208 or any other type of overlay network 208. In accordance with one embodiment of the present invention, the VPN overlay network 208 comprises a VPN server 304 or similar type of head end. The VPN server 304 may provide connections between various P2P networks 232 and other communication devices 320 not assigned to a P2P network. In one embodiment, the VPN overlay network 208 may be configured in a hub-and-spoke configuration or topology where the VPN server 304 acts as a transparent transport and router sensitive to SIP applications. In a hub-and-spoke topology, communications between communication devices belonging to the VPN overlay network 208 and/or between P2P networks 232 are routed through the VPN server 304. Each P2P network 232 may have a different dependency on the VPN server 304, depending upon policies set up for the P2P network 232.

In an alternative embodiment, the VPN overlay network 208 may be configured in a mesh topology, where each communication device in the VPN overlay network 208 communicates directly with other communication devices without the use of the VPN server 304. Accordingly, different P2P networks 232 may be able to communicate with one another directly when the VPN overlay network 208 is in a mesh configuration. In hub-and-spoke and mesh type configuration, the enterprise managing the VPN overlay network 208 may select fine-grained traffic access control of IP flows at the VPN server 304. In other words, the routing of IP traffic may or may not necessarily flow through the VPN server 304, depending upon the message being transmitted.

In accordance with embodiments of the present invention, the VPN server 304 may be provided with a management console 308. The management console 308 may be adapted to define a constrained P2P network 232 based on the defined VPN overlay network 208 or any other type of overlay network 208. In other words, the management console 308 may define the boundaries of what entities can communicate within a P2P community. The management console 308 may also define policies for the entities within a given P2P network 232. This helps to create customized security features and/or assure more reliable communications between members of the P2P network 232. The management console 308 may also maintain and enforce the membership to various P2P networks 232. As can be seen in FIG. 3, a P2P network 232 typically comprises a membership of less than all communication devices in the VPN overlay network 208, although such a limited membership is not required. The management console 308 may maintain the identities of communication devices in the VPN overlay network 208 as well as their respective membership(s).

In accordance with one embodiment, the management console 308 may identify and differentiate between the communication devices 312 belonging to the P2P network 232 and the communication devices 320 not belonging to a P2P network 232. Furthermore, the management console 308 may maintain records of which P2P network 232 a particular communication device 312 and/or user is assigned to. For instance, a first set of communication devices 312, 320 may belong to the entire VPN overlay network 208. A first sub-set of those communication devices may belong to the first P2P network 232a, while other sub-sets of those communication devices may belong to the second 232b and third 232c P2P networks. In accordance with at least some embodiments of the present invention, a communication device 312 and/or user may belong to a number of different P2P networks 232, although such an embodiment is not explicitly depicted in FIG. 3.

The management console 308 may maintain records of P2P network 232 membership to facilitate the autonomous P2P communications within a P2P network 232. Each P2P network 232 may be autonomous to the extent that its capabilities and policies are defined away from the infrastructure (i.e., the VPN overlay network 208) upon which it relies to communicate. The management console 308 may communicate with various communication devices 312 in a P2P network 232 to ensure that they are consistent in the way they communicate with one another.

The configuration and relative autonomy of the P2P networks 232 may also vary depending upon the type of communication devices employed in the P2P network 232. The first P2P network 232a provides an example of a first possible P2P network topology. More specifically, the first P2P network 232a comprises a server 316 or similar dedicated processing and/or routing device that connects the communication devices 312 in the first P2P network 232a. The server 316 may be provided with a management console 308 to define and enforce the policies of the P2P network 232. The management console 308 may be adapted to facilitate the routing of messages and data between member communication devices 312, thereby creating a hub-and-spoke type topology. However, a mesh topology may also be contemplated in the first P2P network 232a having a server 316. The server 316 may also act as a type of supernode in the first P2P network 232a, allowing a certain, level of supervision so that all communication devices 312 in the first P2P network 232a are born equal.

Furthermore, the communication devices 312 in the first P2P network 232a may have their incoming and outgoing messages rented through the server 316 during a communication session with communication devices 312, 320 not in the first P2P network 232a. Therefore, the server 316 essentially acts as a router for the entire first P2P network 232a with the rest of the VPN overlay network 208 and the broader communication system 200.

The term "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

The management console 308 may also centrally manage authentication between communication devices 312 in the first P2P network 232a. Authentication between communication devices 312 may be required prior to allowing a communication session to ensue. In a P2P network 232 where authentication is centrally managed, a key may be passed from one communication device 312 to another, or directly to the management console 308, prior to establishing a connection. The received key may then be provided to the management console 308, if it has not already been so provided, where an authentication decision is made. The authentication decision may be made using any known type of symmetrical or asymmetrical authentication protocol. If the authentication is verified (i.e., it is determined that both communication devices belong to the same P2P network 232), then the management console 308 informs the receiving communication device 312 that a communication session is permitted. However, the policies of die P2P network 232 may still be enforced during the communication session. The step of authentication is useful to help each communication devices 312 assure that it is engaging in a secure communication session with other communication devices 312 in the same P2P network 232.

In an alternative embodiment, decentralized authentication between communication devices 312 may be allowed. The management console 308 may maintain the list of keys and associated communication devices 312 and provide that list to various communication devices 312 in the first P2P network 232. This allows all communication devices 312 in a P2P network 232 to be able to internally authenticate with another communication device 312 prior to initiating a communication session. The management console 308 may periodically provide the list to the appropriate communication devices 312 or supply the list upon request. Alternatively, the management console 308 may distribute the list whenever the list is updated.

The second P2P network 232b provides a second example topology for a P2P network 232. The second P2P network 232b does not have a sever 316 to act as a router to the greater VPN overlay network 208, coordinate and manage policies of the P2P network 232, and perform other processing tasks. Rather, the second P2P network 232b comprises a plurality of communication devices 312, at least one of which is equipped with a management console 308 interconnected in a mesh topology, although a hub-and-spoke topology may also he supported in the second P2P network 232b.

In the second P2P network 232b depicted in FIG. 3, each communication device 312 is connected to at least two other communication devices 312, resulting in the mesh topology. The meshed network may facilitate communications between communication devices 312 through any communication device 312. The communication device 312 comprising the management console 308 may be considered a boss type communication device 312, though which some predefined traffic may flow through, otherwise the rest of the traffic is routed through the broader mesh of the second P2P network 232b. This particular topology helps to relieve processing demands of a single server 316 as well as the possibility of a single point of failure for the entire P2P network 232. The second P2P network 232b is autonomous much like the first P2P network 232a, in that the management console 308 can define various policies specific to the second P2P network 232b independent of the communication structure of the VPN overlay network 208.

Communication between communication devices 312 belonging to the second P2P network 312 and communication devices 312, 320 not belonging to the network may be routed through the designated communication device 312 (i.e., the communication device 312 comprising the management console 308). Therefore, the designated communication device 312 acts as a router for the second P2P network 232b to other P2P networks 232, communication devices 320, and any other communication device in the communication system 200.

The management console 308 contained in the server 316 of the first P2P network 232a and in the designated communication device 312 of the second P2P network 232b may be adapted to operate autonomously, that is without assistance from the management console 308 in the VPN server 304. Accordingly, each P2P network 232 may be locally managed by its corresponding management console 308. In an alternative embodiment, the management responsibilities of a P2P network 232 may be shared between the management console 308 on the VPN server 304 and the management console 308 corresponding to the P2P network 232. Even though only one communication device 312 is depicted as having a management console 308 provided thereon, one skilled in the art will appreciate that each communication device 312 in the VPN overlay network 208 may be provided with a management console 308, thereby providing each communication device 312 autonomy from the VPN server 304.

The third P2P network 232c provides a third example for a P2P network topology that may be employed in accordance with embodiments of the present invention. The third P2P network 232c does not have a sever 316 to act as a rooter nor does it have any local management console 308. Rather, the third P2P network 232c comprises a plurality of communication devices 312 interconnected in a mesh topology, although a hub-and-spoke topology may also be supported. The communication devices 312 in the third P2P network 232c comprise essentially the same capabilities and can operate in the same manner. Each communication device 312 in the third P2P network 232c may be able to communicate with outside communication devices, instead of rooting messages and data, through a designated communication device 312.

Each P2P networks 232 may have a first set of policies to enforce for communications within the P2P network 232 and a second different set of policies for communications outside of the P2P network 132. Communications within the P2P network 232 can have a higher assurance of security and continuity as each communication device 312 in the P2P network 232 is required to adhere to the same policies when communicating in the P2P network 232. This makes communications within a P2P network 232 more efficient and reliable.

Figure 3B:
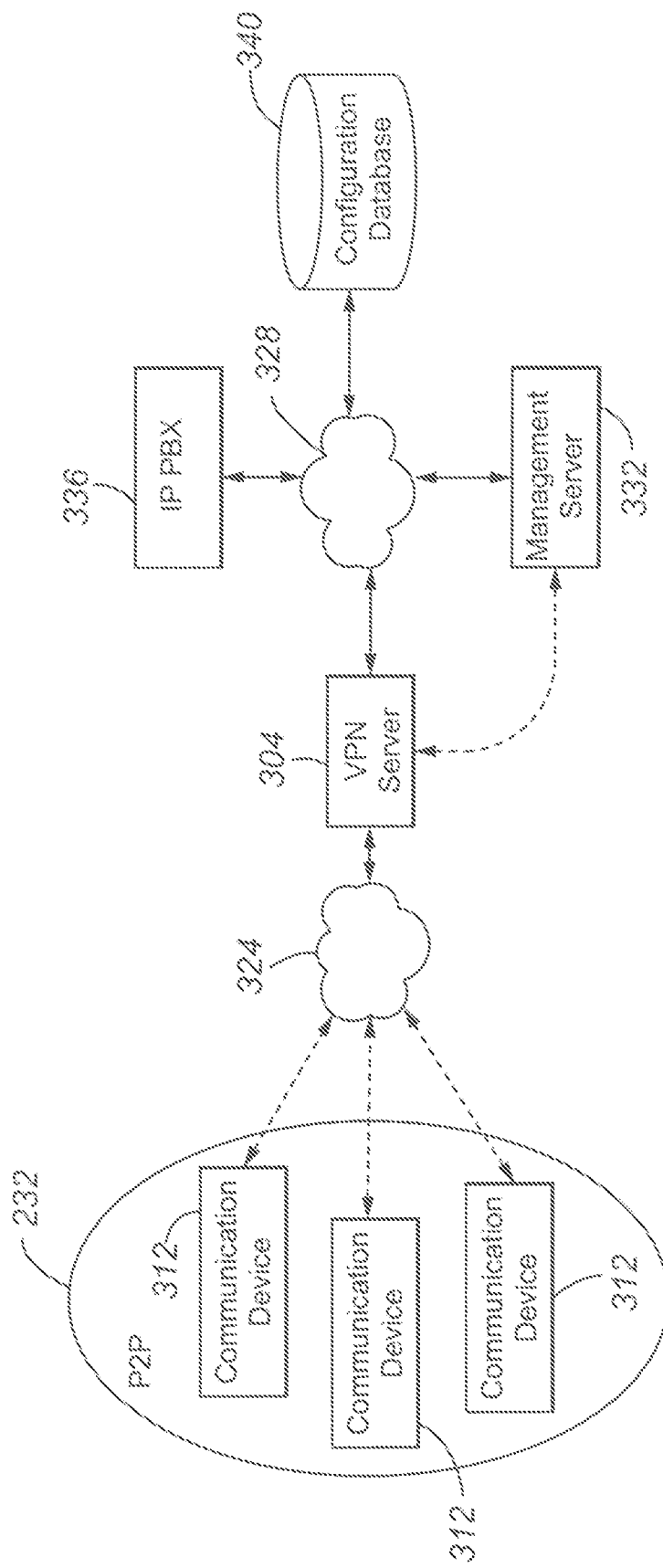
FIG. 3B is a block diagram depicting details of a hub-and-spoke P2P network in accordance with embodiments of the present invention.

Referring now to FIG. 3B, details of a hub-and-spoke P2P network 232 will be further described in accordance with at least some embodiments of the present invention. The hub-and-spoke P2P network 232 may include a membership of a number of communication devices 312 in communication with the VPN server 304 via a first, communication network 324, such as the Internet or some other distributed communication network. The VPN server 304 may be in communications with a second communication network 304, such as an enterprise network or other type of intranet. The VPN server 328 may be in communication with a management server 332, an IP PBX 336, and a configuration database 340 via dm second communication network 328.

The VPN server 304 may enable policy provisioning and enforcement in the P2P network 232. Over the hub-and-spoke topology, the provisioning may come from some entity in the enterprise (e.g., the management server 332) with connectivity to and authorization to control the VPN server 304. The VPN server 304 may generally act as the enforcement point in such a topology for the P2P network 232. The policy provisions may be maintained in the configuration database 340 for reference by the VPN server 304.

The enforcement of the provisions may occur at the network level (e.g., IP level), the transport level (e.g., TCP/UDP level), and/or the application level (e.g., SIP web, SOAP, etc.) by analysis of the IP traffic and by applying the rates at different depths in the datagrams and session state. Policies regarding access control, QoS, and routing enforcements may be enforced by the VPN server 304 in the P2P hub-and-spoke network 232 established over a VPN.

Figure 3C:
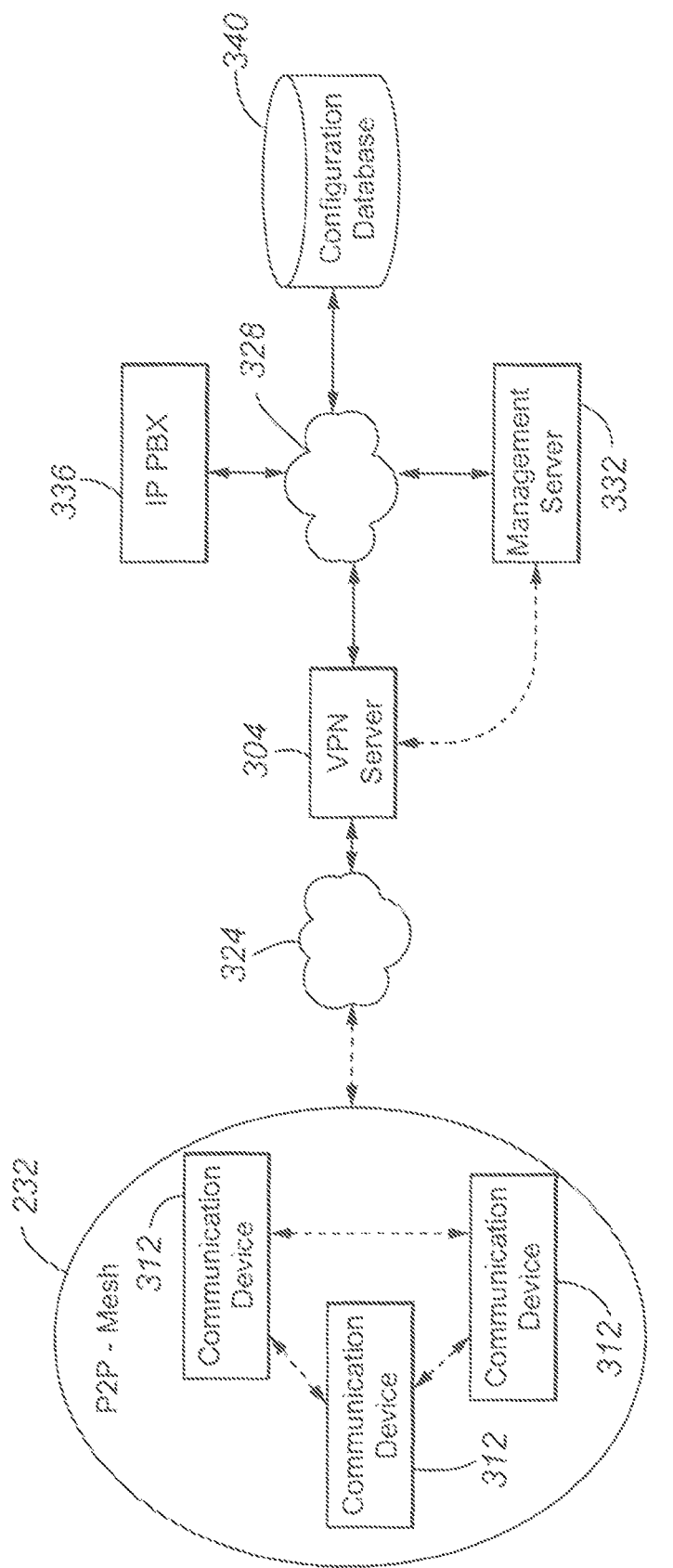
FIG. 3C is a block diagram depicting details of a full-meshed P2P network in accordance with embodiments of the present invention.

With reference now to FIG. 3C, details of a full-meshed P2P network 232 model will be described in accordance with at least some embodiments of the present invention. Policies in the mesh P2P network 232 may also be administered by the VPN server 304. However, the access control, QoS, and routing policies may be distributed and autonomous once instituted. The P2P communications between communication devices 312 is direct between nodes and may be optionally governed by policy conditions per enterprise configuration from the management server 332 at provisioning time.

The full mesh FTP network 232 allows all P2P nodes to run traffic directly to its peers. The control of policies by the VPN server 304 is optional in such a topology. Nevertheless, the VPN server 304 can form the optional control gateway to bridge the P2P network 232 to an enterprise IP PBX 336 (call server) or any other application server connected to the second communication network 328. The VPN server 304 may control the P2P network 232 based on participation policies governing the P2P network 232. The management server 332 may configure the P2P network 232 and delegate control management to the VPN server 304.

The full mesh P2P network 232 may delegate control to the autonomous P2P network 232 except when it comes to communicating outside its community, such as with another P2P network 232 or to dynamically join and leave the main enterprise (e.g., IP PBX 336 and/or intranet) user community.

With reference now to FIGS. 4A and 4B two exemplary data structures employed by a management console 308 will be described in accordance with at least some embodiments of the present invention. Referring initially to FIG. 4A, a user-centric data structure 404 will be described in accordance with at least some embodiments of the present invention. The data structure 404 comprises a number of data fields for maintaining the P2P network(s) 232 in the overlay network 208. The types of data fields that may be provided in the data structure 404 include, without limitation, a user field 408, a communication device field 412, an ID field 416, a key field 420, a P2P network field 424, and a policies field 428.

The user field 408 contains data describing or identifying a particular user or group of users. The user is typically a member and has access to the overlay network 208. The user may also be associated with one or more communication devices, which can be described in the communication device field 412. The communication device field 412 may describe which communication device or devices are associated with a particular user. Examples of such devices that may be associated with a user include, for example, a computer or laptop, a traditional analog phone, a packet-based phone, a VoIP phone, a cellular phone, a Personal Digital Assistant (PDA), a video-phone, and/or a portable email retrieval device. The description of the communication device may include a description of the type of communication device as well as an identifier for the given device. The identifier for a particular communication device may include an IP address, an extension, a port address, a serial number, or any other type of unique or quasi-unique identifier.

The ID field 416 stores an identifier or other type of unique ID that has been assigned to the user and/or to the user's associated communication devices. The ID serves as an identifier for the management console 308 that allows the management console 308 to refer to entities by a single ID. As can be seen in FIG. 4A, an ID may be assigned to a user or may be assigned to each communication device associated with a user. The management console 308 may also use an ID during authentication of communication devices and during routing of messages to/from the communication devices.

Additional data that may be used during authentication is a key. Key information may be maintained in the key held 420. Multiple keys may be maintained in the key field 420 for a single user and/or communication device. One key that may be maintained in the key held 420 is an authentication key. A second key that may be maintained in the key field 420 is an encryption key. The authentication key is used to authenticate a given communication device and/or user and determine what P2P network 232 the communication device and/or user is a member to. The encryption key is used to encrypt messages for transmission across the P2P network 232 and/or outside of the P2P network 232. If no encryption policies are defined for a given P2P network 232, then the assignment of an encryption key to a user and/or communication device may be unnecessary.

In accordance with one embodiment of the present invention, each user and/or communication device is assigned a unique authentication key. The use of a unique authentication key provides a relatively secure P2P network since the authentication keys are generally not shared between multiple communication devices. Alternatively, the management console 308 may determine a name or variety for each individual user and/or communication device and may let the rest of the P2P network 232 know what that determined name or variety is that they should look for. The management console 308 may also inform other communication devices and/or users in a P2P network 232 of the keys corresponding to each of the varieties, and the communication devices may authenticate with other communication devices by examining the key to determine if the key corresponds to a trusted name or variety.

The P2P network field 424 may contain data relating to the P2P network 232 that a given user and/or communication device is assigned to, if any. The P2P network may be labeled as an arbitrary number or as a department in an enterprise. Examples of entities that may use a P2P network 232 on an overlay network 208 include a finance department, an engineering department, a legal department, or any other logical subdivision of persons working in an enterprise and having access to the overlay network 208.

In addition to maintaining the P2P network identification data, the data structure 404 may contain the policy data for the given P2P network 232. The policy data as noted above, may differ between each P2P network and is stored in the policy data field 428. The policies defined for a particular P2P network 232 may control operating parameters of at least one of the application layer, transport layer, or network layer in the OSI model or TCP/IP model. This allows the security of each P2P network 232 to be separately maintained and controlled from other P2P networks in the overlay network 208. Furthermore, certain P2P networks 232 may require stricter policies for certain aspects of communication whereas other P2P networks 232 may not require as strict a policy. The policies for the given P2P network 232, and accordingly the policies that will be applied to the assigned user and/or communication device are outlined in the policy field 428. In accordance with one embodiment of the present invention, the policies for a given P2P network 232 are applied equally across all entities assigned to the P2P network 232. The types of policies that may be defined in the policy data field 428 include, but are not limited to, encryption policies, security policies, external communication policies, application policies, routing policies, communication traffic policies, and other policies for controlling and coordinating communications at the application layer, transportation layer, and/or network layer.

Although a single user is depicted as being associated with a number of communication devices, embodiments of the present invention also contemplate the association of a number of users with a single communication device. Moreover, even though each user is shown being assigned to a particular P2P network 232, at least some embodiments of the present invention provide the ability to assign a communication device to a P2P network 232 rather than the user.

Referring now to FIG. 4B, a P2P network-centric data structure 432 will be described in accordance with at least some embodiments of the present invention. The data structure 432 may comprise a number of data fields containing data related to a given P2P network. Examples of such fields include, without limitation, a P2P network identifier field 426, a user field 440, an ID held 444, a key field 448, and a policy field 452.

The P2P new network identifier field 436 contains information describing a particular P2P network 232. Each P2P network 232 may be provided with a descriptive label or a randomly assigned alpha-numeric label. The entities assigned to a particular P2P network 232 are identified in the user field 440. In accordance with one embodiment, each P2P network 232 comprises a membership of at least two entities. A user and/or communication device may be assigned to one or more P2P networks 232.

Each P2P network 232 may be assigned an ID and key that is unique to the given P2P network 232. The ID for a P2P network may be maintained in the ID field 444, while the key may be maintained in the key field 448. The key may be unique to the P2P network 232 and therefore shared among all users in the P2P network. The key may comprise an authentication key and/or an encryption key. When a user and/or communication device is assigned to a given P2P network 232, the associated key and/or ID may be transmitted to the assigned user and/or communication device. Then, when the user tries to contact another user, the key and/or ID is transmitted to the receiving user such that the receiving user can verify that the sending user belongs to the same P2P network 232 and policies for communication session can be established.

The communication policies for the P2P network 232 may be maintained in the policies held 452. The policies described in the policy field 452 may be similar to the policies in the policy field 428 of the user-centric data structure 404. The management console 308 may utilize one or both data structures 404, 432 to help maintain the P2P networks 232 in the overlay network 208 and further manage the entities assigned to such P2P networks 232. The data structures 404, 432 may also be shared among communication devices or other network nodes in a given P2P network 232.

Figure 5:
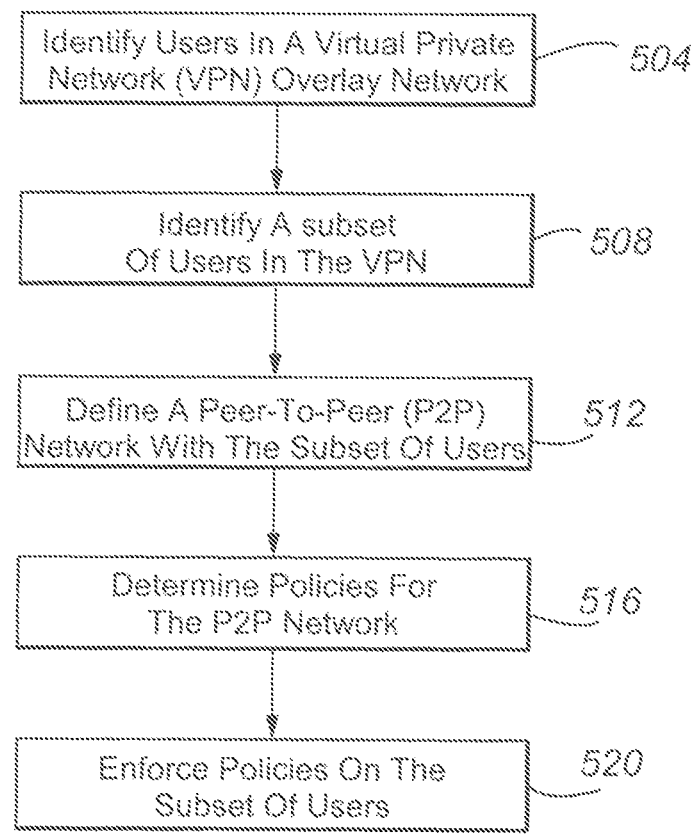
FIG. 5 is a flow diagram depicting a method of creating a P2P network in accordance with embodiments of the present invention.

FIG. 5 is a flow chart depicting a method of creating a P2P network 232 in accordance with at least some embodiments of the present invention. The method begins when an overlay network 208, such as a VPN overlay network 208 and more specifically an IPsec VPN overlay network, is established over a public communications network 204. The entities in the overlay network 208 are then identified and retained in memory (step 504).

Once the entities in the VPN overlay network 208 have been identified, the method continues by identifying a sub-set of those entities (step 508). The identified sub-set of entities is generally smaller than the set of entities belonging to the VPN overlay network 208 and is therefore not inclusive of all entities assigned to the VPN overlay network 208.

Following the identification of the sub-set of entities, the method continues by defining a P2P network 232 far the sub-set of entities (step 512. The P2P network 232 is established on top of the VPN overlay network 208 in order to receive the security benefits associated with the VPN overlay network 208. The sub-set of entities are then allowed to communicate with one another in a peer-to-peer fashion over the P2P network 232.

After the P2P network 232 has been established on top of the VPN overlay network 208, the management console 308 determines policies for the P2P network 232 (step 516). The policies may be user defined (i.e., defined by one or more entities belonging to the P2P network 232), defined by a system administrator, and/or defined by certain base policies established by the VPN overlay network 208. One type of policy that may be determined includes a definition of certain applications that can be used to communicate over the P2P network 232. Examples of suitable communication applications that may be either permitted or restricted by the application policy include email, VoIP, SMS text, chat, Instant Messaging (IM), and video, as well as protocols defined in the application layer of the TCP/IP model (e.g., DHCP, FTP, HTTP, POP3, SIP, SMTP, SSH, RCP, RTP, RTCP, and DNS). The policies defined in this step may also establish restrictions or permissions for the transport layer protocols (e.g., TCP, UDP, DCCP, SCTP, GTP, etc.) and network layer protocols (e.g., IPv4, IPv6, ARP, RARP, ICMP, IGMP, RSVP, IPsec, and so on). Other policies that may be determined for a P2P network 232 include policies governing communications with entities not belonging to the P2P network 232. Furthermore, routing policies for messages within the P2P network 232 as well as those going outside the P2P network may also be determined.

With the policies for the P2P network 232 determined, the management console 308 enforces the policies on the member entities of the P2P network 232 (step 520). In this step, the management console 308 determines when two entities within the same P2P network 232 are establishing a communication session with each other and defines the parameters under which the entities can communicate. Alternatively, each entity belonging to the P2P network 232 may be provided with the policy information and when they determine that they are communicating with another entity belonging to the same P2P network 232, the entities will automatically enforce die policies to help establish reliable and consistent communications within, the P2P network 232.

Figure 6:
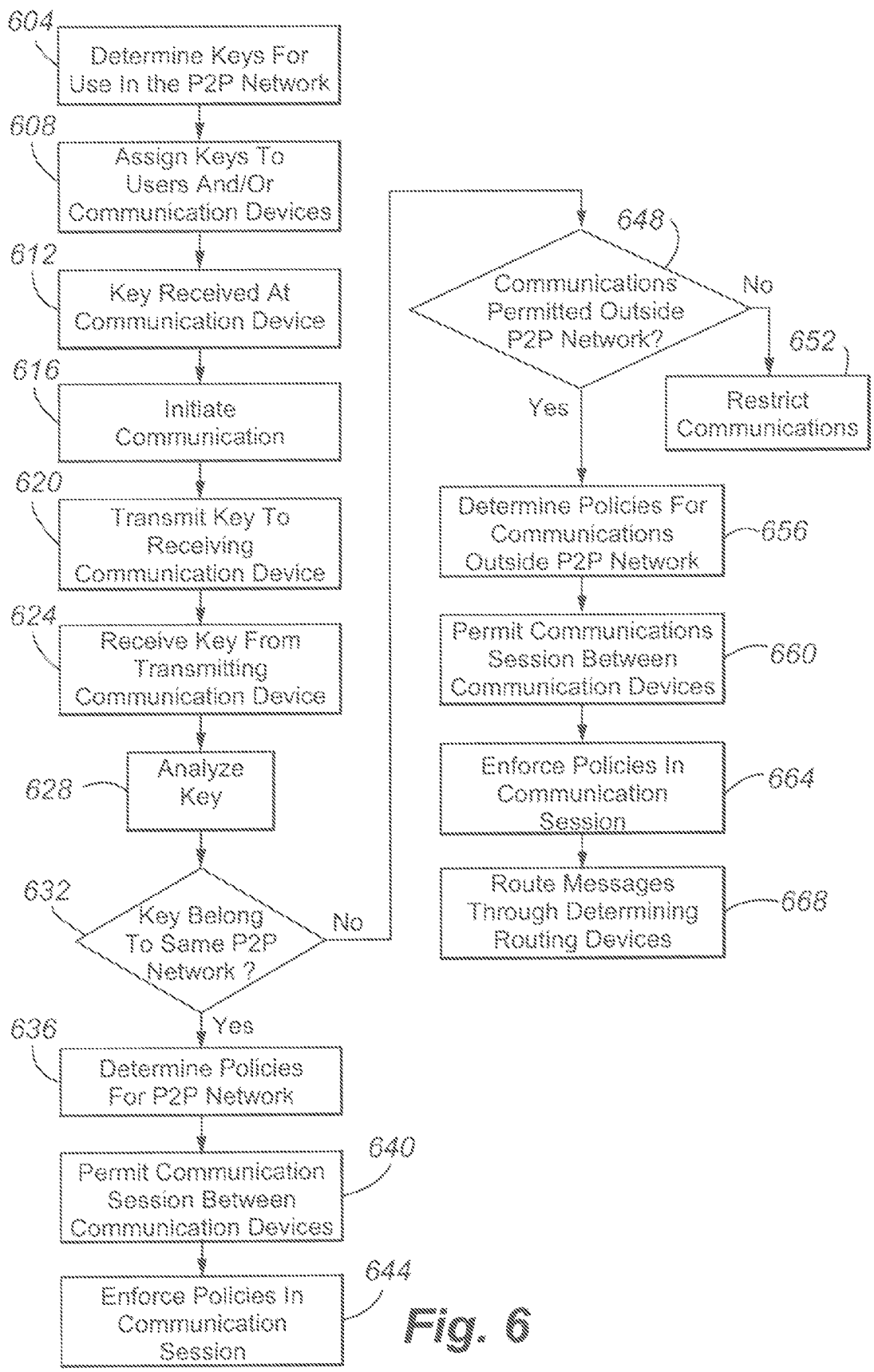
FIG. 6 is a flow diagram depicting a method of facilitating communications for Devices in a P2P network in accordance with embodiments of the present inventions.

Referring now to FIG. 6, a method of facilitating communications for entities in a P2P network 232 will be described in accordance with at least some embodiments of the present invention. The method begins with the management console 308 determining keys for use in the P2P network 232. The keys used in the P2P network 232 may be unique to each entity in the network or may alternatively be unique to the network itself. Embodiments utilizing unique keys (e.g., encryption and authentication) for each entity may provide a higher level of security than those where the key is shared between all entities of the same P2P network 232. The size of the keys may be any size used in known encryption and authentication protocols. If a higher level of security is desired for the P2P network 232, then a relatively high strength key (e.g., a 128-bit key) may be employed. If a lower level of security is desired for the P2P network 232, then a low strength key or even a general ID may be assigned to entities.

After the key(s) have been determined for the P2P network 232, and more specifically for entities belonging to the P2P network 232, the keys are assigned to entities within the network. The assignment of the keys to the entities may simply comprise associating an entity identifier with a particular key in one of the data structures 404, 432 described above. Alternatively, the assigned key may be transmitted to the entity where it can be maintained for immediate access.

In the event that the keys are sent to the entities in the P2P network 232, the method continues when the entities receive their assigned keys (step 612). The type of transmission protocol employed may depend upon the level of security desired. If a relatively high level of security is desired for the P2P network 232, then the keys may be encrypted prior to transmission to the assigned entities.

Once the entities have received their respective keys, or at least had keys assigned thereto, the method continues when one entity initiates communications with another entity (step 616). Communications may be initiated when a call is placed to another communication device or by the selection of a communication device or user from a list of communication devices or users. Upon initiating the communications, the key is transmitted to either the receiving entity (i.e., the communication device which did not initiate the communication session) or the management console 308, whichever device will be responsible for the authentication decision (step 620).

Thereafter, the key is received at the appropriate device (step 624). In one embodiment, the key is transmitted directly to and received by the device responsible for authentication. In an alternative embodiment, the key may be initially transmitted to the receiving communication device, which in-turn forwards the key to the management console 308. When the appropriate device has received the key, the key is analyzed by the receiving device (step 628). In this step, the analysis may include determining what the identity of the transmitting communication device is, what user is associated with the transmitting communication device, and/or what P2P network 232 the transmitting communication device is associated with. The analysis of the key may also include certain decryption steps if the key was encrypted for transmission as well as a comparison step where the key or key format is compared against known keys or key formats in the data structures 404, 432.

After the key has been properly analyzed, it is determined if the key, and therefore the transmitting entity, belong to the same P2P network 232 as the receiving entity (step 632). In the event that the transmitting and receiving entities belong to the same P2P network 232, then the management console 308 determines the communication policies that will govern the communications between the devices (step 636). More specifically, the management console 308 determines the policies for the P2P network 232. Of course, if the management console 308 resides on each communication device, then each device may already know the policies governing P2P communications prior to establishing any communications link.

With the communication policies determined, the method continues by permitting the communication session between the respective entities (step 640). As apart of permitting the communication session, the determined policies for the session are enforced by the management console 308 and/or by the communication devices themselves (step 644).

Referring back to step 632, if the analysis of the received key indicates that the transmitting entity does not belong to the same P2P network 232, then the method continues by determining if communications are permitted outside of the P2P network 232 (step 648). In the event that entitles of a certain P2P network 232 cannot communicate with other entities not belonging to the P2P network 232, then the communications between the entities is restricted and the communication link is severed (step 652).

On the other hand, if communications with entities outside of the P2P network 232 are permitted, then the method continues by determining communication policies for sessions involving communications outside of the P2P network 232 (step 656). The policies governing communications outside of a P2P network 232 may differ from policies governing communications within a P2P network 232. For example, a higher level of security may be achieved within a P2P network 232 than outside of the P2P network 232. Furthermore, routing policies may differ for communications leaving the P2P network 232. For instance, a communication device 312 or server 316 may be designated as the point through which all messages are routed that will not stay in or have not emanated from the P2P network 232. This essentially means that entities belonging to the same overlay network 208 may not necessarily communicate with each other in the same fashion. Rather, the nature of such communications will depend upon which P2P networks 232 the respective entities belong to, if any. Of course, the communication session will still maintain the framework and policies laid out by the overlay network 208 as a whole.

Once the permissions for the communication session outside the P2P network 232 have been established, the method continues by permitting the communication session between the entities (step 660). As a part of permitting the communication session outside the P2P network 232, the determined policies for the session are enforced by the management console 308 and/or by the communication devices themselves (step 664). Furthermore, if the policies dictate that communications are to be routed through a designated routing device, then the communication session continues with the routing of messages through the chosen routing device (step 668). The designated routing device is usually a part of the P2P network 232 of at least one of the entities. Furthermore, if both entities belong to different P2P networks 232, then each may he required to route messages through a designated routing device, in which case all messages will be routed through two predetermined routing devices.

Figure 7:
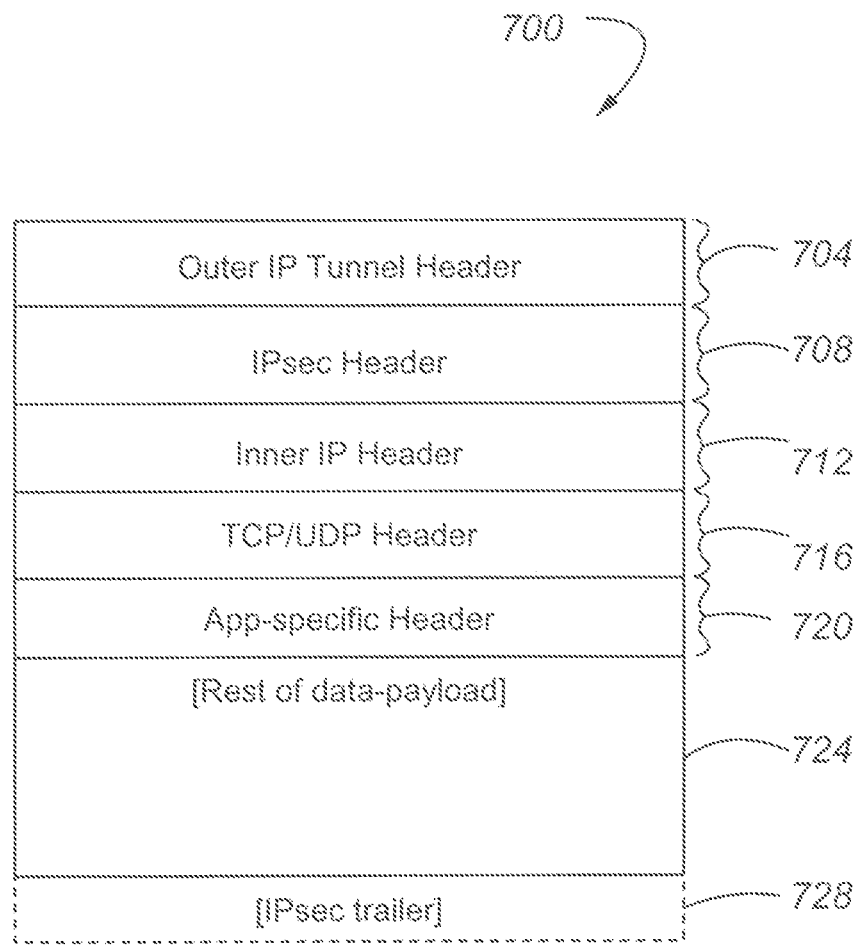
FIG. 7 is a block diagram depicting a packet structure employed in accordance With embodiments of the present invention.

FIG. 7 depicts an exemplary packet structure 700 employed in accordance with at least some embodiments of the present invention. The packet 700 may be divided into three tiers for a three-tier policy approach of the P2P VPN, which is also referred to as a nested triple overlay. The packet 700 may comprise an outer IP tunnel Header 704 corresponding to a first part of the first tier, an IPsec Header 708 corresponding to a second part of the first tier, an inner IP Header 712 corresponding to a third part of the first tier, a TCP/UDP Header 716 corresponding to the second tier, and an application specific Header 720 corresponding to the third tier. The packet 700 may also comprise a payload section 724 for carrying the packet payload and an IPsec Trailer 728. The three tiers may be independently and in many cases concurrently applied to the packet 700. The Inner IP Header 712, TCP/UDP Header 716, application specific Header 720 and/or payload section 724 may comprise the sections of the packet that are encrypted for transmission across an untrusted network. The encrypted portions of the packet 700 may either be visible or invisible to the VPN server 304 depending upon security policies. The encrypted portions may be visible for the hub-and-spoke P2P network 232 when the VPN server 304 exercises more control creating a less autonomous P2P network 232. The portions may be invisible in a mesh P2P network 232 where less control and more autonomy is given to the P2P network 232.

The first tier corresponds to the Layer 3 policies for the P2P network 232 on the overlay network 208. The first tier may be divided into three different parts. The first part of the first tier may use the outer IP tunnel Header 704 to guide traffic to the destination mesh node in a full mesh configuration or to the destination P2P node via the VPN server 304 in the hub-and-spoke configuration. Thus, in a hub-and-spoke configuration the packet 700 may comprise an addition outer IP Header (not depicted) that heads above the packet to describe the destination. In either configuration, the Outer IP tunnel Header 704 can carry QoS information. The information in the Outer IP tunnel Header 704 may also be used for access control based on destination and for routing decisions. The second part of the first tier represented by the IPsec Header 708 may be used primarily for carrying security policy enforcement information. The third part of the first tier represented by the Inner IP Header 712 may be used to carry additional enforcement information as well as data related to the control by the VPN server 304 for the hub-and-spoke configuration. The information in the Inner IP Header 712 may also alter QoS policies at the final destination.

The second tier corresponds to the Layer 4 policies for the P2P network 232 on the overlay network 208. The second tier utilizes the TCP/UDP Header 716 to store information for discriminating between application protocols at the transport layer. Strong access controls can also be applied using the TCP/UDP Header 716. These access control policies may be governed by the flexibility of the VPN policy. For example, access control policies may vary based on whether the configuration of the VPN is end to end or hub-based and whether or not encryption is enforced or not.

The third tier corresponds to the application policies and utilizes the application specific Header 720 to store application specific information. For example, the application specific Header 720 can be used to decide whether or not a SIP P2P node user can make SIP calls while blocking SIP instant messages and other SIP based features. This is a feature policy specific to the application and the SIP protocol employed thereby. Information may also be used to decide on which codecs can be allowed as a part of the QoS policies and what bandwidth may he consumed. It may also control whether TLS encrypted signals and SRTP encrypted media may be transported in the payload section 724. The application, specific Header 720 may also contain information that determines whether certain calls should be redirected to voicemail in an enterprise as an example of a routing policy.

As discussed above, in the three tier nested overlay, the P2P network overlay can be realized at the base IP layer (i.e., the first tier) as defined by the IPsec VPN configuration (e.g., mesh or hub-and-spoke configuration). The first tier can further be overlayed by the TCP/UDP transport layer or second tier. The second tier distinguishes between different protocols (e.g., SIP, SMTP, HTTP, FTP, Telnet, etc.) that is to be employed in the P2P network by using port numbers and protocols (e.g., TCP, UDP, or ICMP) Both of these tiers can be overlayed by the third tier which defines the application level awareness. The third tier may define the VPN server 304 logic through application layer gateways or modules in the hub-and-spoke configuration or by distributed application policy configuration at the P2P nodes for the full mesh configuration. With the exception of configuration time involvement, the management server 332 and the rest of the enterprise infrastructure (e.g., devices connected to the second communication network 328) leaves the P2P VPN to its autonomous impulse and control based on topology.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques Illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilised. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for providing a P2P network. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   providing a Virtual Private Network (VPN) overlay network for a first set of communication devices; and
   defining a first and second peer-to-peer network over the VPN, the first peer-to-peer network being defined for a second set of communication devices over the VPN overlay network and the second peer-to-peer network being defined for at least one of a third set of communication devices and third set of users over the VPN overlay network, wherein the at least one of a second set of communication devices and second set of users are in at least one of a first set of communication devices and first set of users, wherein the at least one of a third set of communication devices and third set of users are in the at least one of a first set of communication devices and first set of users.

2. The method of claim 1, wherein the first set of communication devices comprises all of the communication devices in the second and third set of communication devices and wherein the second and third set of communication devices do not comprise all of the communication devices in the first set of communication devices.

3. The method of claim 1, further comprising:
   defining communication policies for the second set of communication devices;
   defining communication polices for the third set of communication devices, the communication policies for the third set of communication devices being different from the communication policies for the second set of communication devices; and
   enforcing the communication policies for the second and third sets of communication devices in the peer-to-peer network and from the peer-to-peer network to the rest of the communication devices in the first set of communication devices.

4. The method of claim 3, wherein communication policies for the second and third communication devices comprise at least one of security policies, permissions, routing policies, permissible applications, and encryption policies.

5. The method of claim 3, further comprising:
   determining at least one of a name and variety for each communication device in the peer-to-peer network;
   assigning a key to each communication device in the peer-to-peer network; a receiving communication device belonging to the peer-to-peer network receiving a key from a sending communication device;
   determining, by the receiving communication device, that the received key corresponds to at least one of a name and variety for a communication device in the peer-to-peer network; and
   permitting a communication session between the receiving communication device and the sending communication device in accordance with the communication policies.

6. The method of claim 3, further comprising:
determining at least one of an identifier and key;
assigning the at least one of an identifier and key to each communication device in the peer-to-peer network;
a receiving communication device belonging to the peer-to-peer network receiving at least one of an identifier and key from a sending communication device;
determining, by the receiving communication device, that the received at least one of an identifier and key corresponds to the assigned at least one of an identifier and key; and
permitting a communication session between the receiving communication device and the sending communication device in accordance with the communication policies.

7. The method of claim 1, further comprising:
determining that a communication device in the peer-to-peer network wants to establish communications with a communication device not in the peer-to-peer network;
the communication device in the peer-to-peer network generating a message for transmission to the communication device not in the peer-to-peer network; and
transmitting the message to the communication device not in the peer-to-peer network by routing the message through a predetermined communication device belonging to the peer-to-peer network.

8. The method of claim 1, further comprising the second set of communication devices utilizing packets comprising at least an outer IP tunnel header, an IPsec header, and an inner IP header.

9. In an overlay network established on top of a public communication network, the overlay network having a first set of users capable of communicating with one another, an apparatus, comprising:
a management console adapted to define a plurality of peer-to-peer networks over the overlay network, wherein each peer-to-peer network in the plurality of peer-to-peer networks defined over the overlay network comprise different user groups and different communication policies associated therewith, and wherein users in each peer-to-peer network defined over the overlay network are also in the first set of users.

10. The apparatus of claim 9, wherein at least some users in the first set of users are not in a peer-to-peer network.

11. The apparatus of claim 9, wherein the management console is further adapted to define the communication policies for each of the peer-to-peer networks, wherein the communication policies for users in the peer-to-peer networks differ from policies for the first set of users that are not in a peer-to-peer network, and wherein the management console is further adapted to control communications between users in the peer-to-peer network and users not in the peer-to-peer network.

12. The apparatus of claim 11, wherein the communication policies for each of the peer-to-peer networks comprise one of restrictions and permissions related to at least one of TCP/IP application layer protocols, transport layer protocols, and network layer protocols.

13. The apparatus of claim 9, wherein at least one peer-to-peer network defined over the overlay network comprises a mesh topology.

14. The apparatus of claim 9, wherein the overlay network comprises at least one of an IPsec, an L2, and an L3 VPN overlay network configured in at least one of a mesh and hub-and-spoke topology.

15. The apparatus of claim 9, wherein each user in the first set of users is associated with at least one communication device and wherein each communication device in a first peer-to-peer network is adapted to establish communications with one another using a predetermined TCP/IP application layer protocol.

16. The apparatus of claim 9, wherein the management console is further adapted to determine and assign a key to each user in a first peer-to-peer network defined over the overlay network such that the use of the assigned key in communications indicates that the user providing the assigned key belongs to the first peer-to-peer network defined over the overlay network.

17. The apparatus of claim 16, wherein the key assigned to each user in the first peer-to-peer network comprises a common key.

18. The apparatus of claim 16, wherein each user in the first peer-to-peer network is assigned a unique key.

19. The apparatus of claim 16, wherein the key comprises at least one of an authentication key, an encryption key, and an identifier.

20. The apparatus of claim 16, wherein users in the first peer-to-peer network communicate with one another using packets comprising an outer IP tunnel header, an IPsec header, and an inner IP header, a TCP/UDP header, an application specific header, and data payload.

21. A communication device, comprising:
a management console adapted to define a plurality of peer-to-peer networks of users over an overlay network and a set of policies for controlling communication capabilities between the users in each peer-to-peer network, wherein each peer-to-peer network in the plurality of peer-to-peer networks defined over the overlay network comprise different user groups and different communication policies associated therewith.

22. The device of claim 21, wherein the management console resides on a communication device associated with a user belonging to a peer-to-peer network defined over the overlay network.

23. The device of claim 21, wherein the management console resides on a server adapted to at least partially facilitate the overlay network.

24. The device of claim 21, wherein the overlay network comprises at least one of an IPsec, an L2, and an L3 VPN overlay network, and wherein at least one peer-to-peer network defined over the overlay network is configured in a mesh topology.

25. A non-transitory computer readable medium having stored thereon instructions that cause a computing system to execute a method, the instructions comprising:
instructions configured to provide a Virtual Private Network (VPN) overlay network for a first set of communication devices and first set of users; and
instructions configured to define a first and second peer-to-peer network over the VPN, the first peer-to-peer network being defined for a second set of communication devices over the VPN overlay network and the second peer-to-peer network being defined for at least one of a third set of communication devices and third set of users over the VPN overlay network, wherein at least one of a second set of communication devices and second set of users are in at least one of a first set of communication devices and first set of users, wherein the at least one of a third set of communication devices and third set of users are in the at least one of a first set of communication devices and first set of users.

* * * * *